US012254791B2

(12) United States Patent
Hofenauer et al.

(10) Patent No.: US 12,254,791 B2
(45) Date of Patent: Mar. 18, 2025

(54) SECURITY LABEL FOR A MULTI-PART CONTAINER, USE OF A SECURITY LABEL, SYSTEM AND METHOD FOR APPLYING A SECURITY LABEL FOR A MULTI-PART CONTAINER

(71) Applicant: Schreiner Group GmbH & Co. KG, Oberschleissheim (DE)

(72) Inventors: Andreas Hofenauer, Germering (DE); Nadine Lampka, Munich (DE); Stefan Krauss, Munich (DE); Ursula Schroepf, Deggendorf (DE); Peter Zimmermann, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 0 days.

(21) Appl. No.: 18/543,107

(22) Filed: Dec. 18, 2023

(65) Prior Publication Data

US 2024/0119870 A1 Apr. 11, 2024

Related U.S. Application Data

(62) Division of application No. 17/282,456, filed as application No. PCT/EP2019/075744 on Sep. 24, 2019, now abandoned.

(30) Foreign Application Priority Data

Oct. 4, 2018 (DE) ..................... 10 2018 124 526.2

(51) Int. Cl.
*G09F 3/02* (2006.01)
*G09F 3/00* (2006.01)
(Continued)

(52) U.S. Cl.
CPC .......... *G09F 3/0288* (2013.01); *G09F 3/0292* (2013.01); *G09F 3/0295* (2013.01);
(Continued)

(58) Field of Classification Search
None
See application file for complete search history.

(56) References Cited

U.S. PATENT DOCUMENTS

| | | | |
|---|---|---|---|
| 4,545,494 | A | 10/1985 | Sawicki |
| 5,048,711 | A | 9/1991 | Weiss et al. |

(Continued)

FOREIGN PATENT DOCUMENTS

| | | | |
|---|---|---|---|
| CA | 2067693 | A1 | 11/1992 |
| CN | 1629904 | A | 6/2005 |

(Continued)

OTHER PUBLICATIONS

International Search Report in PCT/EP2019/075744, mailed Dec. 6, 2019.

(Continued)

*Primary Examiner* — Laura C Powers
(74) *Attorney, Agent, or Firm* — Collard & Roe, P.C.

(57) ABSTRACT

A system includes a container and a security label. The container is divisible into a plurality of parts and has a container body and a removable container closure. The security label has a first label section and a second label section forming respective parts of a common material web and a severing element which is arranged between the first and second label section with respect to a longitudinal axis of the security label. The security label is applied to the container such that the first label section is attached to the container body and the second label section surrounds the container closure. The second label section is formed such that the security label is closed along an edge line above the
(Continued)

container closure by gluing and/or welding such that the second label section encloses the removable container closure.

8 Claims, 10 Drawing Sheets

(51) Int. Cl.
*G09F 3/03* (2006.01)
*G09F 3/10* (2006.01)

(52) U.S. Cl.
CPC .............. *G09F 3/0341* (2013.01); *G09F 3/10* (2013.01); *G09F 2003/0251* (2013.01); *G09F 2003/0269* (2013.01); *G09F 2003/0272* (2013.01)

(56) References Cited

U.S. PATENT DOCUMENTS

| | | | | |
|---|---|---|---|---|
| 5,217,307 | A | 6/1993 | McClintock | |
| 5,271,981 | A | 12/1993 | Oxenhandler | |
| 5,506,015 | A | 4/1996 | Fredericksen et al. | |
| 6,276,725 | B1 | 8/2001 | Laurash et al. | |
| 7,141,286 | B1 | 11/2006 | Kessler et al. | |
| 8,182,450 | B2 | 5/2012 | Moosheimer et al. | |
| 9,893,889 | B2 | 2/2018 | Enguent et al. | |
| 10,181,272 | B2 | 1/2019 | Krauss et al. | |
| 10,245,589 | B2 | 4/2019 | Gelfand | |
| 10,661,954 | B2 | 5/2020 | Fresnel | |
| 2006/0011504 | A1 | 1/2006 | Gosebruch et al. | |
| 2007/0295737 | A1 | 12/2007 | Del Val Catala | |
| 2008/0308443 | A1 | 12/2008 | Baklycki et al. | |
| 2016/0001012 | A1 | 1/2016 | Igarashi et al. | |
| 2017/0154548 | A1 | 6/2017 | Krauss et al. | |
| 2017/0174379 | A1* | 6/2017 | Mitchell | B32B 27/325 |

FOREIGN PATENT DOCUMENTS

| | | | |
|---|---|---|---|
| CN | 104936699 | A | 9/2015 |
| CN | 106797235 | A | 5/2017 |
| CN | 108016736 | A | 5/2018 |
| DE | 600 31 659 | T2 | 2/2007 |
| DE | 10 2012 112 297 | A1 | 6/2014 |
| DE | 10 2014 110 738 | A1 | 2/2016 |
| EP | 0 512 612 | A1 | 11/1992 |
| EP | 1 555 644 | A1 | 7/2005 |
| EP | 1 566 786 | A1 | 8/2005 |
| EP | 1 561 198 | B1 | 3/2009 |
| EP | 2 654 032 | A1 | 10/2013 |
| EP | 2 664 557 | A1 | 11/2013 |
| EP | 2 962 715 | A1 | 1/2016 |
| ES | 1052705 | U | 2/2003 |
| JP | 2015-066225 | A | 4/2015 |
| WO | 00/62848 | A1 | 10/2000 |
| WO | 2015/089569 | A1 | 6/2015 |

OTHER PUBLICATIONS

Chinese Examination Report in CN 201980065592.6, issued Jun. 13, 2022.

European Examination Report dated Apr. 21, 2023 in European Application No. 19 779 802.8 with English translation of the relevant parts.

Hermetic Seal via Wikipedia, https://en.wikipedia.org/wiki/Hermetic_seal; Internet Wayback Machine date available Apr. 11, 2016 (Year: 2016).

Dr. Andreas Hofenauer, Stefan Krauss, Tom Van Ginneken, "Pharmaceutical Labeling for Pre-Filled Syringes", Next—Report on New Solutions for Pharmaceutical Packaging, 6 pages, Issue No. 7, 2020.

* cited by examiner

SECURITY LABEL FOR A MULTI-PART CONTAINER, USE OF A SECURITY LABEL, SYSTEM AND METHOD FOR APPLYING A SECURITY LABEL FOR A MULTI-PART CONTAINER

CROSS REFERENCE TO RELATED APPLICATIONS

This application is a divisional of and Applicant claims priority under 35 U.S.C. §§ 120 and 121 of U.S. application Ser. No. 17/282,456 filed on Apr. 2, 2021, which application is a national stage application under 35 U.S.C. § 371 of PCT Application No. PCT/EP2019/075744 filed on Sep. 24, 2019, which claims priority under 35 U.S.C. § 119 from German Patent Application No. 10 2018 124 526.2 filed on Oct. 4, 2018, the disclosures of each of which are hereby incorporated by reference. A certified copy of priority German Patent Application No. 10 2018 124 526.2 is contained in parent U.S. application Ser. No. 17/282,456. The International Application under PCT article 21(2) was not published in English.

BACKGROUND OF THE INVENTION

1. Field of the Invention

The present invention relates to a security label for a multi-part container, which can contribute to reliable tamper evidence for a multi-part container in a simple and cost-effective manner. The invention also relates to a use of such a security label for a multi-part container, and to a system comprising such a security label and a multi-part container. The invention further relates to a method of applying such a security label.

2. Description of the Related Art

Security labels can be used for authorization as well as authentication or proof of origin, and can be used, for example, when it is necessary to protect ingredients against unauthorized access and to identify the opening of the associated container. This applies in particular to containers in the pharmaceutical and medical sectors whose contents has to be protected against manipulation.

SUMMARY OF THE INVENTION

It is an object underlying the invention to contribute to a reliable tamper protection for a multi-part container in a simple and cost-effective manner.

The object is achieved by the features of the independent patent claims. Advantageous embodiments are given in the dependent claims.

According to an aspect of the invention, a security label for a multi-part container comprises a first label portion configured to be attached to a first part of the container, and a second label portion configured to be attached to and to encircle a second part of the container with respect to a state of the security label it is applied to the container, such that the security label is closed in itself along an edge line at a free end of the second label portion facing away from the first label portion. The two label portions thereby form a respective mutually adjacent part of a common material web. The security label further comprises a severing member disposed between the first label portion and the second label portion with respect to a longitudinal axis of the security label, such that when the container and the applied the security label thereon are opened, the security label is severable predeterminedly by means of the severing member and the second label portion is removable together with the second part of the container from the first label portion and the first part of the container.

By means of the described security label, a reliable tamper protection for a multi-part feasible in a simple and cost-effective manner. The security label can have a single-layer or a multilayer structure including several layers. It can be formed partially or completely self-adhesive or it can comprise an adhesive layer on its underside partially or completely.

The second label portion or section is formed such that, with respect to a state applied to the container, it forms a kind of sealed hat around and over the second part of the container, which is realized, for example, as a screwable or peelable closure as an upper removable part of the container. Such a sealed label closure of the second label portion cannot be opened non-destructively, so that a safe and reliable tamper protection is feasible by means of the described security label.

In particular, the second label portion can be formed such that, with respect to a state applied to the container, the security label is sealed along the edge line firmly closed in itself. For example, the second label portion is provided with an adhesive surface on an underside such that, with respect to a state applied to the container, it is adhesively sealed in itself along the edge line. Alternatively or additionally, a material may be provided at the free end of the second adhesive portion that is weldable so that the security label is sealed and closed in itself by welding along the edge line with respect to a state applied to the container.

The second label portion forms an upper section of the security label, while the first label section or portion forms a lower section of the label. Accordingly, the upper, second label portion is associated with an upper portion of the container, which forms, for example, a head, cap, lid, or primary closure or other closure of the container. The lower, first label portion is associated with a lower portion of the container, for example a body or reservoir of the container. In the context of this description, terms such as “upper” and “lower” refer to an operational arrangement and application, respectively, of the security label and the container, with the upper, second label portion being associated with the upper, second portion of the container which is removed to open the container.

The security label is particularly suitable for two-part containers, such as syringes and vials, wherein the first label portion is attached to the body of the container and the second label portion is located in the region of the removable second part of the container. The two label portions are integrally formed from a common material web and are substantially separated or limited from each other by the severing member. When the container is opened and the security label is severed, the first and second label sections form two parts separate from each other.

The first label portion is firmly attached to the container body or the first part of the container with respect to an intended applied state of the security label. The second label portion is optionally fixedly attached to the cap or the lid or the second part of the container, respectively, or is connected to the cap or the lid in a merely contacting manner and is closed above the cap or the lid. Alternatively, the second label portion may be closed above the cap or lid without contacting the cap or lid.

The second label portion is configured to be closed above the removable second portion of the container with respect to an applied state. Accordingly, the second label portion is configured with respect to its length and width to intentionally protrude above the second portion of the container to enable selective closing and sealing of the top end of the second label portion. Thus, when the security label is applied to a cylindrical container, the second label section extends beyond the second portion of the container in the direction of the longitudinal axis at least as far as it corresponds to the radius of the second portion of the container. With respect to a width transverse to the longitudinal axis, the second label portion is at least as wide as it corresponds to the circumference of the second part of the container, such that a wrap-around label can be formed at least in this section. In addition, the security label, for example in the second label portion, can also configured to be longer and wider in order to realize an over-round label which comes to rest at least partially on itself with respect to an applied state and which enables a simple, secure and reliable sealing.

Thus, by means of the upwardly closed security label, a labeling and sealing function can be realized which can be manufactured easily and inexpensively, and which also provides reliable tamper protection as well as initial opening proof for a multi-part container. Here, the upper, second label portion can completely hermetically enclose the removable, second part of the container or it can contain predetermined openings for providing a certain stretchability of the security label.

The security label enables efficient sealing of the container, that can be divided into several parts. By means of the described structure and the predefined inserted severing element, a clear and irreversible indication of a first opening, an unauthorized opening or a manipulation of the container and the applied security label is provided. Thus, a reliable verification of the integrity of the security label, for example on a medicament package, can be enabled prior to use. Reuse of the container, for example a syringe, after use and other manipulative uses of parts of the packaging or the container as well as refilling can be prevented or at least indicated clearly by means of the security label.

According to a preferred embodiment, the security label comprises an adhesive layer arranged on an underside of the first label portion, such that the security label can be attached to the container by means of adhesion. Such an adhesive layer enables reliable attachment of the security label to the container in a simple manner by adhering the first label portion to an outer wall of the first part of the container, which represents, for example, the body of a syringe or injection vial or vial, respectively, containing a predetermined ingredient.

Moreover, the first label section can also be designed to allow additional wrapping of the container in the area of the first part before a trailing combination of the remaining, first label portion and the second label portion is dispensed over an entire height or length of the container. In this simple manner, a specific increase in the diameter of the container body can be achieved for some types of syringes, for example.

The adhesive layer may also completely cover the underside of the security label and also allow the second label portion to adhere to the second part of the container and to the free end with itself. Preferably, the security label has an adhesive-free surface in the area of the severing element which allows for easier severing of the security label and removal of the second label portion from the first label portion. The force required to separate the two label portions is thus reduced compared to a fully adhesive security label, and the opening dynamics of the container applied with the security label are improved.

The severing element can be formed in coordination with the container to be applied on, in particular, in an area of the security label which, in an applied state on the container, is associated with a transition between the first part and the second part of the container.

The severing element is located, for example, in a region of a lower end of the primary cap corresponding to the head or the second part of the container, respectively. A sufficiently forceful twist or pull on the second part of the container simultaneously causes a predetermined severing of the security label, so that the second label portion and the second part of the container are detachable from the first label portion and the first part of the container. However, the severing element may also be disposed in other areas that allow the label portions to be separated from each other when the container is opened. In particular, if the security label is multilayered, the severing element may be arranged, for example, well below the region of the lower end of the primary cap, so that the upper layer of the security label is predetermined to tear.

Moreover, the second label portion can be formed with predetermined surface properties that enable easier opening of the container and cutting of the security label by the user. Such beneficial surface properties can be realized, for example, with the use of anti-slip lacquers or by means of printed tactile elements that enable safer gripping of the second label portion.

According to a preferred further embodiment, the severing element is formed as or comprises a perforation or a tear strip. By means of a tear strip, the security label can also be selectively severed before the second part of the container is pulled or rotated. Thus, a targeted severing of the security label along the predetermined perforation or the given tear strip can be performed in a simple and inexpensive manner when the container provided with the security label is opened. In particular, the perforation can also be combined with die cuts or branches upwards and/or downwards in order to leave clearly visible damages after the container has been opened and the security label has been cut through. The perforation, for example, comprises an F- or Y-shape or if formed wave- or jag-shaped in order to realize a clearly visible indicator for an initial opening.

Furthermore, according to a further embodiment, the security label may comprise a thickness compensating element arranged in the second label portion to provide size compensation with respect to different geometries of the first and second parts of the container. In particular, such a compensating element may be in the form of one or more die cuts, fold lines or as a printed layer or in the form of one or more additional film layers. The punchings or die cuts and fold lines provide a certain stretchability of the second label portion, which is particularly useful if the head or the second part of the container is designed to be larger than the body or the first part of the container with respect to a direction transverse to the longitudinal axis. In this case, the punchings can be formed as a plurality of v-shaped or line-shaped incisions. With a plurality of fold lines, the security label can have a fan-like structure to provide flexibility with respect to different geometries of the containers that are intended to be labeled and sealed. By means of such thickness compensation elements, the security label can be set up for geometrically different containers and thus enable a wider range of applications in a simple and cost-effective manner.

By means of a predetermined applied printing layer or additional foil layer, tolerances with respect to the geometry of the container can also be pre-compensated. For example, by means of a print layer or additional film layer, an undesired free space between the second label portion and the container can be filled and reduced in order to enable a secure and stable hold of the security label on the container and also to contribute to increased protection against tampering.

The described thickness compensating elements therefore realize in particular a possibility to compensate different radii of a container body and its removable cap with respect to rotationally symmetrical containers.

In addition, the security label may include an indicator layer disposed in the region of the severing element on the first and/or second label portion and which is configured to indicate removal of the second label portion from the first label portion. For example, the security label may have a void structure in the region of the severing element.

In this context, a void structure offers additional protection against tampering, which is implemented by means of two or more structures with different adhesive strengths. For example, a stronger adhesive structure in the form of lettering is implemented in the void structure, while other sections of the void structure are weaker adhesive. If the void structure or the security label comprising a void structure is applied to a container to be secured, the more strongly adhesive lettering remains adhered to the object or the first label portion when the multi-part container is opened, while the weaker adhesive sections are removed from the object with the second label portion. Alternatively, the at least two structures described may be reverse in terms of their adhesive strength, so that, for example, the structure in the form of lettering is weaker adhesive. Alternatively or additionally, the indicator layer may comprise colored characters for reliably indicating an initial opening.

Alternatively or additionally, a partially opaque severing element, for example, can expose an underlying layer, which in turn indicates the opening of the container by means of eye-catching design such as colored areas, lettering or other indicators.

The security label can further be formed with a predetermined contour of the first and/or the second label portion, so that with respect to a state of the security label applied to the container the sealed edge line replicates a predetermined geometry and is formed, for example, in a straight line or rounded. The shape of the sealed edge line can alternatively or additionally be machined during sealing or subsequently by means of tools. For example, a desired shape of the sealed edge line is formed during sealing by welding the free end of the second label portion.

According to a further aspect, the invention comprises a use of an embodiment of the described security label for a container that is divisible into a plurality of parts.

In accordance with a further aspect of the invention, a system comprises a container divisible into a plurality of parts having a first part and a second part, and an embodiment of the security label described above applied to the container such that the first label portion is attached to the first part of the container and the second label portion surrounds the second part of the container circumferentially such that the security label is sealed within itself at the free end of the second label portion along its edge line.

In that the use and the system relate to or comprise an embodiment of the described security label, all of the described properties and features of the security label, if any, are also disclosed for the use and the system, and vice versa.

According to a further aspect of the invention, a method of applying an embodiment of the security label to a multi-part container comprises attaching the first label portion of the security label to a first part of the container and attaching the second label portion of the security label to a second part of the container such that the second label portion predefinedly encloses the second part of the container. The method further comprises closing the free end of the second label portion inwardly along the edge line, thereby sealing the second label portion.

By means of the described application method, it is possible to use the properties and features provided by the security label in relation to the container to be secured to form a secure and reliable tamper protection, which enables a reliable and clearly recognizable proof of first opening. In that the method relates to an application of an embodiment of the described security label, all of the described properties and features of the security label are also disclosed for the method, if applicable, and vice versa.

In the following, the described security label is explained again for the most part using the example of a container of a two-part syringe. However, the properties and characteristics can also be transferred with regard to other multi-part containers.

Both the primary closure or second part of the syringe and the syringe body or first part of the syringe are enveloped by one and the same security label and, if necessary, are connected to the label via corresponding adhesive surfaces. The security label extends to and preferably extends well beyond a tip of the primary closure, allowing for easy and reliable sealing of the top end of the second label portion. By means of the sealed upper end of the second label portion, manipulative access to the primary cap is prevented or at least counteracted.

Opening the container is accompanied by clearly visible damage to the security label. Opening the primary cap by means of a rotary motion or pulling off the primary cap leads to destruction of the material web of the security label due to breaking or tearing of a perforation, cutting of a base material of the material web, such as foil, paper or other materials, detachment of adhesive areas or exposure of void fields.

By means of the security label, therefore, a label-based sealing solution can be implemented which simultaneously functions as a body label and a closure seal. Because the security label with the second label portion projects beyond the primary cap, the upper end of the second label section can be securely and reliably sealed, for example, by means of simple and inexpensive joining techniques such as gluing, ultrasonic welding, vibration welding, hot plate welding or laser welding. In this way, the second label portion forms a label envelope including a sealing function around the head of the syringe and can enclose the container, like a second skin, and provide a protective function for the medicament or ingredient of the syringe. Such protection can prevent or at least counteract unwanted exposure to light, UV radiation, penetration or leakage of water, water vapor, solvents, humidity or other small-molecule substances.

The security label can be firmly connected to the container body by means of an adapted adhesive selection and simultaneously in the area of the primary cap by means of adhesive. Alternatively, the security label can be bonded to the container body by means of adhesive and only by means of the first label portion and in the area of the cap by means of the second label portion only adhering to itself and sealing at its upper end. The security label may have a flat surface that is firmly bonded to a substrate, for example. In order to be able to cover different radius ratios of body to cap of a respective syringe, the security label can also be designed in such a way that it can be wrapped several times around the container and forms an overround label by means of several wrappings with the label material.

The security label can also be folded like a fan or can comprise some other thickness compensating element to wrap around the syringe and compensate for the different thicknesses or diameters where there is a larger diameter compared to adjacent areas of the container. Size compensation can also be achieved by, for example, using a matrix technique in a screen printing process to print very high lines or layers on the first and/or second label portion at a predetermined position where the radius of the container is smaller than in adjacent or neighboring areas.

The security label preferably has a severing element in the form of a perforation, so that no additional work step is required when opening the syringe to sever the security label. By means of special perforation geometries, a controlled and predetermined tearing can be clearly visible, for example along an inserted contour. Provided that an adhesive is also provided in the second label portion, the second label portion remains on the primary cap after opening of the syringe and does not form an individual part of the security label in the form of a separate waste. The two label portions formed during opening remain connected with the respective associated part of the container, that is, the first label portion remains on the syringe body and the second label portion remains on the syringe cap. Such retention on the respective part of the container and thus reduction of individual parts to be disposed of is of particular importance in a surgical environment.

The position of a perforation as a severing element can be in a transition between the container body and the primary cap, or it can be formed completely in the area of the container body. In the latter variant, appropriate adhesive-neutralizing or multilayer constructions of the security label are useful, which make it possible to transfer the opening forces to the area of the container body and to tear the perforation applied there in a controlled manner. It is also possible to expose a lower layer of the security label below the perforated layer so that, for example, specified structures or indications, such as "OPEN" lettering, are visible from the outside and clearly indicate an initial opening.

The severing element can also comprise a tear strip as an opening mechanism, which cooperates with a perforation, for example. The security label has, for example, a bulge in the area of the perforation as a grip tab, so that the security label below the primary closure can be destroyed rotationally with the tear strip and the primary closure can be removed together with the upper second label portion, which is arranged above the tear strip in relation to the longitudinal axis.

In particular, the security label can find advantageous use in syringes with a Luer-lock closure. In the case of prefillable glass syringes with a Luer-lock closure, a plastic thread attached to the glass syringe can be held in place by means of the described security label. In this way, the thread can also be prevented from turning, especially when screwing in a cannula, or can be counteracted from turning. In addition, the security label can be used to prevent or counteract the Luer thread from coming off, in particular when administering highly viscous medicaments, such as hyaluronic acid.

The security label thus enables simultaneous labeling and sealing of a multi-part container. For this purpose, the first label portion can, for example, have a corresponding print or a surface that can be labeled. In addition, the security label enables adaptation to different radius ratios of syringes. If the primary cap or the primary closure is designed to be larger than the body of the container, reliable sealing can be achieved by means of the described security label without forming a disadvantageous gap or fold in the area of the head of the container.

The security label can also be manufactured cost-effectively in the form of a continuous web of material in large quantities and, in addition to being used for syringes, can also be used for other multi-part containers. When administering a drug, an additional work step can be saved, since by means of the described security label it is not necessary to first remove a secondary cap or a sealing label. In particular, loose parts can be avoided or reduced when opening the container sealed with the security label.

Application of the security label to a syringe beyond a cap without contacting the needle area may be accomplished as follows: In a dispensing system equipped for this purpose, during dispensing of the security label, a rotatably mounted sleeve may be slid over the cap portion of the syringe to form an overall cylindrical labelable body of the tip without contacting the cap portion. The syringe cap can then be wrapped with an adhesive neutralized label area of the second label portion, which is sealed to itself only in the overlap area as a lap wrap-around label. Thus, the inserted auxiliary in the form of the sleeve can simply be pulled out of the wrapping again. Subsequently, the formed label sleeve or the wrapping second label portion can be closed on itself at its upper, free end. A technical implementation can be similar to that of a beverage filling system with vertically moving sleeves which are, for example, temporarily pushed onto the suspended syringes from below.

The security label has at least one label layer, which functions with the first label portion as a body label and the second label portion as a seal label. According to one embodiment, it connects a primary container body to a primary container cap via the label layer with adhesive. Thus, the two parts of the container cannot be separated and the container cannot be opened without destroying the security label or portions thereof. The security label replicates the opening mechanism of the container and can be opened in either a screwing motion or a peeling motion. The opening is clearly indicated, for example by special perforation geometries that stand up or look deliberately torn and destroyed.

Furthermore, special color designs in different layers of the security label can be used to display a text after opening, such as "Warning! Open!", or a predefined color and thus irreversibly clearly indicate to the user that the security label and the container have already been opened. After opening, one, two or more parts of the security label preferably remain firmly attached to the respective container part adhered thereunder, the first part and the second part of the container. Thus, no undesirable loose parts of the severed security label are produced. In addition, it is not possible to restore the original state of the severed security label by resealing it without leaving behind clearly visible identifying features.

The security label can be flexibly adapted in terms of its design and geometric configuration for any type of container, container size and container material. A radius ratio of a cylindrical container from the container body to the container closure or cap can be equal, smaller or larger within certain limits and can be reliably labeled and sealed by means of the described security label. If, for example, the cap of the syringe is larger than the body, special punched structures or gills in the transition area from body to cap can be used to compensate for any difference in size. Gills represent elongated incisions in the security label at predetermined positions.

Furthermore, the shape of the security label can also be adapted in coordination with the container to be applied. With respect to a top view, the security label has a rectangular contour at its outer edge, for example. However, the security label can also be T-shaped so that, for example, the second label portion is wider than the first label portion or vice versa in order to provide different circumferences. However, the security label can also be v-shaped and taper towards the top, i.e. towards the second part of the container. An asymmetrical design of the security label is also possible. For example, if the cap of the syringe is larger than the syringe body, it may be beneficial for the security label to be tapered or to taper upward to prevent a corner of the label from protruding from the container. Thereby, when using punched structures or gills in the transition area from syringe body to syringe cap, it can be advantageous to make the security label longer in the area of the container body or the first label portion than, for example, in comparison with a container with almost identical geometries from syringe body to syringe cap. In this way, it is possible to help ensure that the security label is vertically and stably connected to the container body before the transition area or second label portion is wrapped around the syringe cap.

To enable reliable and easy attachment of the security label to a corresponding container, the security label may also have edge steps or mutually offset edges to contribute to beneficial and secure adhesion of the security label to the container. For example, the security label may have mutually offset edges along its leading edge between the first and second label portions. The leading edge is the edge of the security label that is preferably applied first when applied to the container.

A special configuration of the security label has a leading extension in the first label portion, which is applied and wrapped in the area of the container body. Beveled label edges of the security label can be useful for applying the second label portion over a circumferentially larger container cap compared to the container body.

By means of such an offset edge, an undesired pushing away of the security label from the syringe cap due to the larger circumference of the syringe cap and an oblique wrapping of the container with the security label can be prevented during application.

In particular, the sealed end of the security label above the cap end of the syringe contributes to safe and reliable tamper protection and also provides a protective function against various impacts. Depending on the choice of material, such a sealed closure of the security label can protect against UV radiation, penetration or leakage of solvents, humidity or other small-molecule substances, among other things, and also provide protection against counterfeiting and abrasion of printed information. A protective function can be specifically formed by a function-specific selection of the label base material or a functional printing.

Closing the label wrapper at the upper end of the second label portion can be realized by means of various techniques. Similar to a sugar bag, the opposite layers of the wrapped second label portion can be brought together and joined, for example welded and/or glued, so that a sealed edge line is formed at the upper end of the second label portion, which can have a slight widening. By means of special tools, the edge line can also be subsequently processed and customized to form a useful and/or recognizable sealed finish to the security label.

Alternatively, a space-saving sealed closure at the upper end of the second label portion can also be produced via simultaneous inversion of opposite sides by means of pressing tines, which can also have a high recognition value and offers the possibility of keeping a width along the edge line smaller than a diameter of the container body or the container head. Such a design of the sealed end of the security label may be particularly advantageous with respect to storage and transport in an associated blister for syringes or other multi-part containers. Among other things, this makes it possible to put labeled and sealed syringes back into packaging intended for this purpose, such as blisters or trays, which have openings that are barely larger than a diameter of the container.

The security label combines the functions of a body label with those of a sealing label in the form of one common label. Access to the container closure is not possible or at least difficult without destroying the security label. Special die-cut geometries and functional surfaces, for example created using matrix printing technology, contribute to secure and reliable protection against tampering and proof of first opening, which can be easily and flexibly adapted to the container to be secured.

According to one variation, a security label may also be formed with an open-topped structure. Such a security label may, if applicable, have all the properties and features of previously described embodiments of an upwardly sealed variant of the security label and vice versa except for the difference that the upper, free end of the second label portion remains open even in a fully applied state of the security label and does not have a self-sealed edge line in the sense of the previously described embodiments.

In the case of the security label with an upwardly open end of the second label portion, this can extend to the cap end of the container or even beyond. When applying such an open security label, one of the challenges is that the security label may not be massaged or pressed onto the container in the area of the second label portion, since no pressure is to be exerted on the container cap. Massaging in this area can therefore also be omitted.

The contour of the security label can be specially designed so that the security label forms a closed ring at the upper end in the area of the cap end, despite the absence of massaging. To ensure that a trailing label corner, which is wrapped around the cap end and designates a right-hand corner at the upper end of the second label portion, does not protrude after application, the contour of the security label can be designed to be tapered or v-shaped towards the center of the label. In this respect, the leading edge of the security label may also be affected or formed so that the security label tapers toward the center of the label, for example, at the leading and/or trailing edge.

The leading edge of the security label can also be designed in such a way that the security label can be easily wrapped around itself when applying and wrapping the container. A correspondingly conical or v-shaped leading label corner, which designates the left-hand corner at the upper end of the second label portion, can also compensate for undesirable protrusion from the container in the absence of massaging.

Both the primary closure, or second part of the syringe, and the syringe body, or first part of the syringe, are encased in the same security label, and are optionally connected to the label via corresponding adhesive surfaces. The security label may either extend to, and optionally extend beyond, a tip of the primary closure and form an open-topped sleeve around the second part of the container. Manipulative access to the primary cap can thus be prevented or at least made more difficult.

An existing gap between the container closure and the second label portion wrapped around the container closure is preferably so small that manual access to the container closure with or without aids is not possible without damaging the security label. In particular, the second label section can have a predefined print layer applied to an underside in this area, which fills the gap between the security label and the container when applied.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1A:
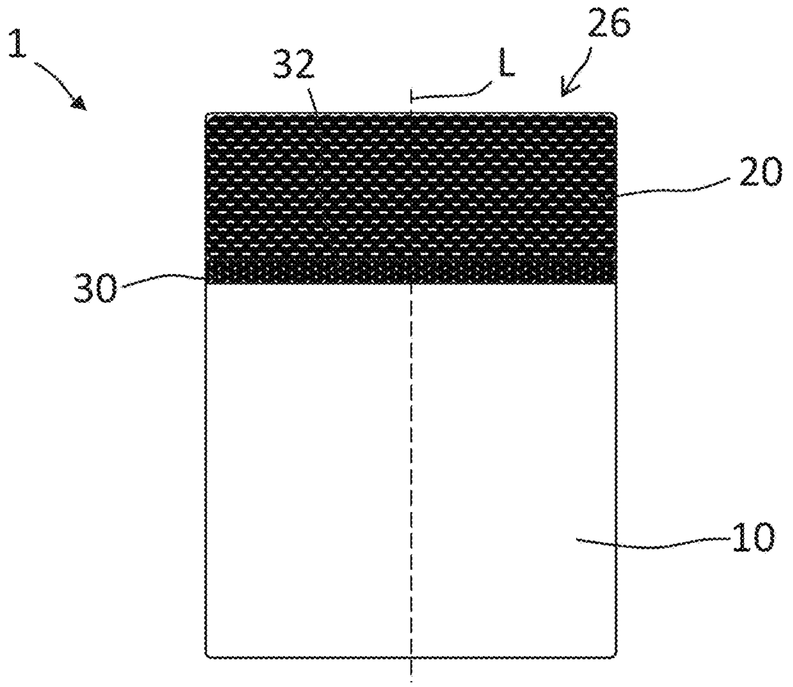
FIGS. 1A-1E show an embodiment of a security label for a multi-part container.

Elements of the same design and function are identified with the same reference signs throughout the figures. For reasons of clarity, not all elements shown in the figures are identified with the corresponding reference signs, possibly.

FIGS. 1A-1E schematically show an embodiment of a security label 1 for a multi-part container using the example of a syringe 40 in various views. The security label 1 has a first label section 10, which is adapted to be attached to a first part of the container, the syringe body 41, and a second label section 20, which is adapted, in a state of the security label 1 applied to the syringe 40, to attach a second part of the container, the syringe head or syringe cap 42, so that the security label 1 is closed in on itself along an edge line 27 at a free end 26 of the second label section 20 facing away from the first label section 10 (see FIGS. 1B-1E).

The two label sections 10, 20 thereby form a respective mutually adjacent part of a common material web. The security label 1 further comprises a perforation 32 as a severing element, which is arranged between the first and the second label sections 10, 20 with respect to a longitudinal axis L of the security label 1, so that when the syringe 40 applied with the security label 1 is opened, the security label 1 can be severed in a predetermined manner by means of the perforation 32 and the second label section 20 can be removed together with the syringe cap 42 from the first label section 10 and the syringe body 41.

According to a preferred embodiment of the security label 1, the perforation 32 is provided as a severing element. Alternatively or additionally, a tear strip may also be implemented as a separating element or comprise such an element in order to enable a controlled separation of the second label section 20 from the first label section 10. The perforation 32 may have a special geometry and is not necessarily arranged parallel to an outer edge of the security label 1.

According to another preferred embodiment of the security label 1, it has an adhesive-free area 30 in the region of the perforation 32, as shown in FIG. 1A. In this way, easy severing of the security label 1 and removal of the second label section 20 from the first label section 10 can be made possible. A force required to separate the two label sections 10, 20 is thus reduced compared to a fully adhesive security label 1 and an opening dynamic of the syringe 40 applied with the security label 1 is improved.

In addition, the security label 1 may also be completely covered with an adhesive layer on an underside to allow easy adhesive attachment of the security label 1 to an outer wall of the syringe 40. However, according to an alternative embodiment, the security label 1 may be completely covered with an adhesive layer on an underside and may not have an adhesive-free region.

Alternatively, the security label 1 has an adhesive layer on the underside of the first label section 10 and spaced therefrom on an underside at the upper end 26 of the second label section 20. The two label sections 10, 20 are substantially bounded by the perforation 32. The adhesive-free area 30 may extend toward the first and/or second label sections 10, 20.

In this context, terms such as "upper", "lower", "above" and "below" refer to the illustrated figures and an operational arrangement or use of the security label 1 and the syringe 40, wherein the upper, second label section 20 is associated with the upper, second part of the container or syringe cap 42 which is removed to open the syringe 40.

Figure 1B:
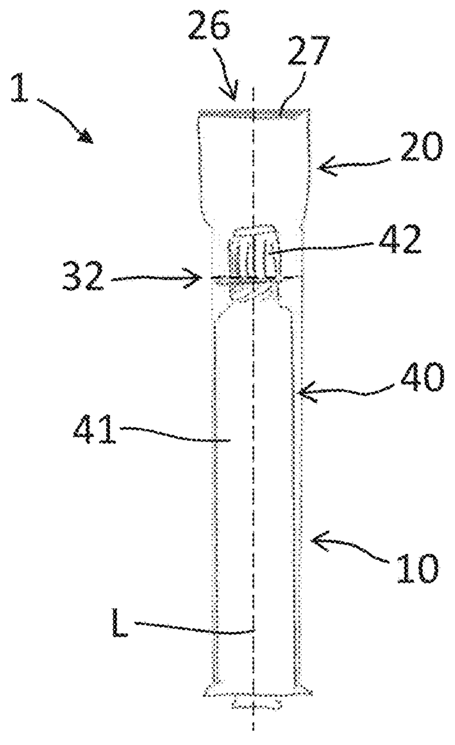
Figure 1C:
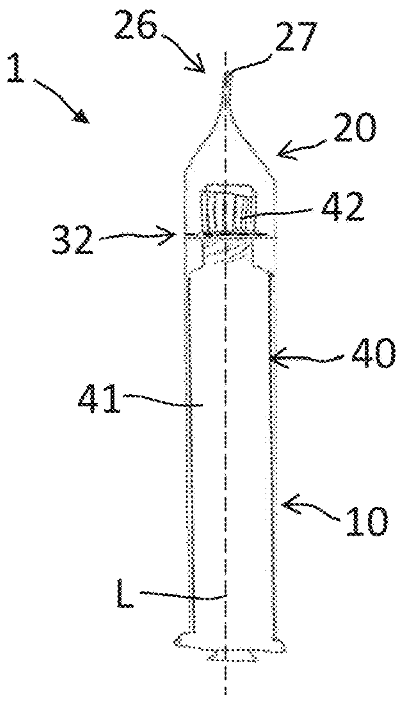

FIGS. 1B and 1C each show a schematic side view of the security label 1 applied to the syringe 40, which has a shape similar to a sugar bag at the upper, sealed end 26. In the fully applied state, the security label 1 simultaneously forms a body label and a sealing label with an intrinsically sealed label cap which hermetically encloses the syringe cap 42, for example. In this way, a particularly reliable and secure tamper protection for the syringe 40 or other multi-part container can be realized and, in addition, a protective function for an ingredient can be provided against radiation and moisture effects and other influences. The security label 1 can also have a multilayer design and further layers, among other things for increased protection or due to documentation purposes.

The security label 1 is sealed above the syringe cap 42 along the edge line 27, for example by the end 26 being glued and/or welded into itself after wrapping around the syringe cap 42. FIG. 1C shows a side view of the security label 1 rotated substantially 90° compared to FIG. 1B.

The perforation 32 is preferably formed in an area of the security label 1 which, in an applied state on the syringe 40, corresponds to the area between the syringe cap 42 and the syringe body 41. A geometry of the security label 1, in particular a width and length of the respective label sections 10, 20 is preferably designed to match the geometry of the syringe 40, so that the security label 1 realizes, for example, a all-around or an overlap wrap-around label.

Figure 1D:
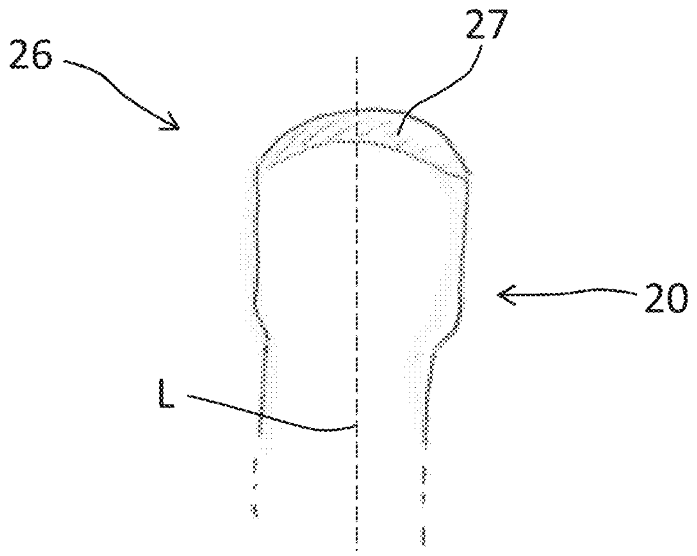
Figure 1E:
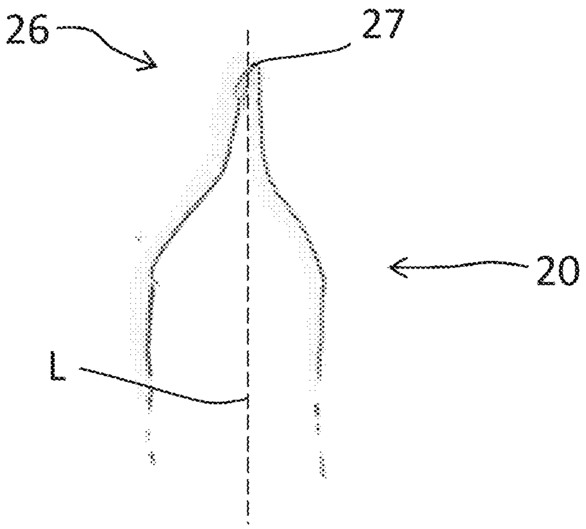
Figure 2A:
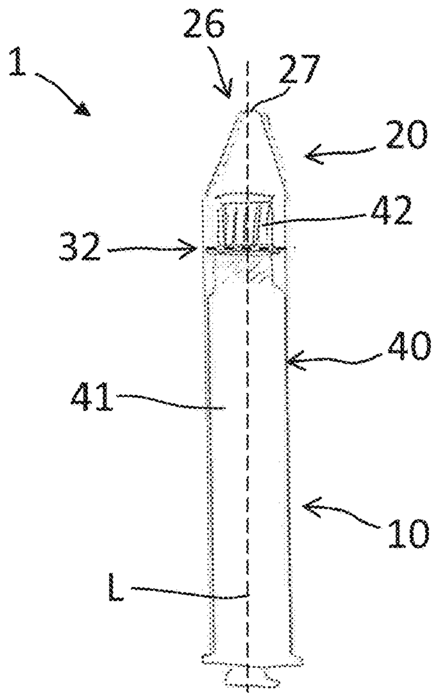
FIGS. 2A-2F show a further embodiment of a security label for a multi-part container.
Figure 2B:
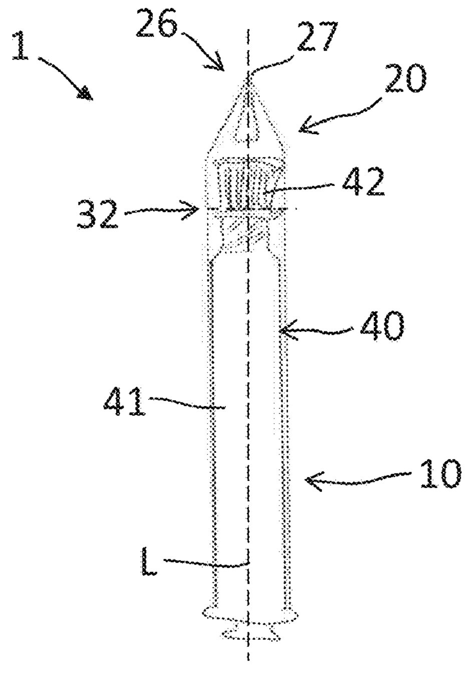
Figure 2C:
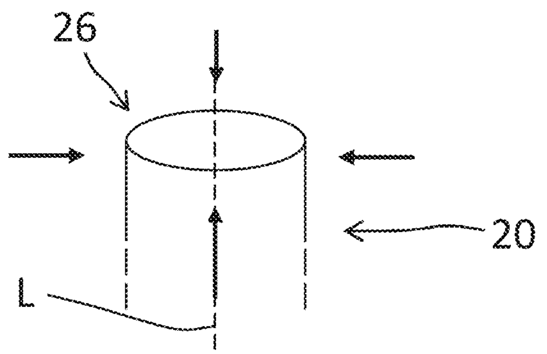
Figure 2D:
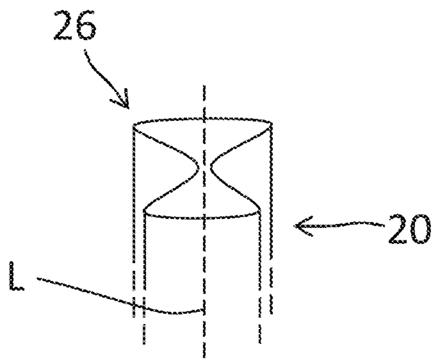
Figure 2E:
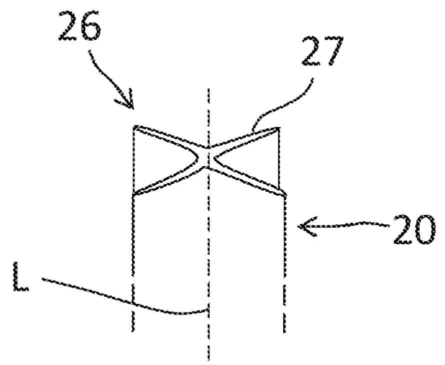
Figure 2F:
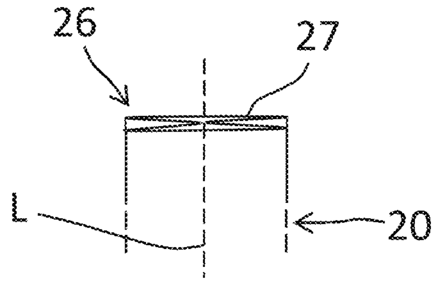

FIGS. 1D and 1E show respective schematic side views of the upper end 26 of the sealed security label 1, which has a rounded edge line 27 in comparison with the illustrations according to FIGS. 1B and 1C. Such a design, or any other design, of the sealed edge line 27 can be processed and customized by means of special tools during sealing or also subsequently after sealing, in order to form a useful and/or recognizable sealed end of the security label 1.

The security label 1 combines the functions of a body label with those of a seal label in the form of one common label. Access to the container closure or syringe cap 42 is not possible or at least difficult without destroying the security label 1.

FIGS. 2A to 2F show in various schematic views a further embodiment of the security label 1 and a formation of a sealed end 26. Such a closure of the second label section 20 along the edge line 27 can be achieved by a simultaneous folding in from opposite sides by means of pressing tines (indicated by arrows in FIG. 2C) and result in a space-saving sealed closure at the upper end 26 of the second label section 20. Such a self-folded closure may also have a high recognition value and further offers the possibility of keeping a width along the edge line 27 smaller than a diameter of the syringe cap 42. Such a design of the sealed end 26 of the security label 1 may be particularly advantageous with respect to storage and transport in an associated blister for syringes 40 or other multi-part containers.

Figure 3A:
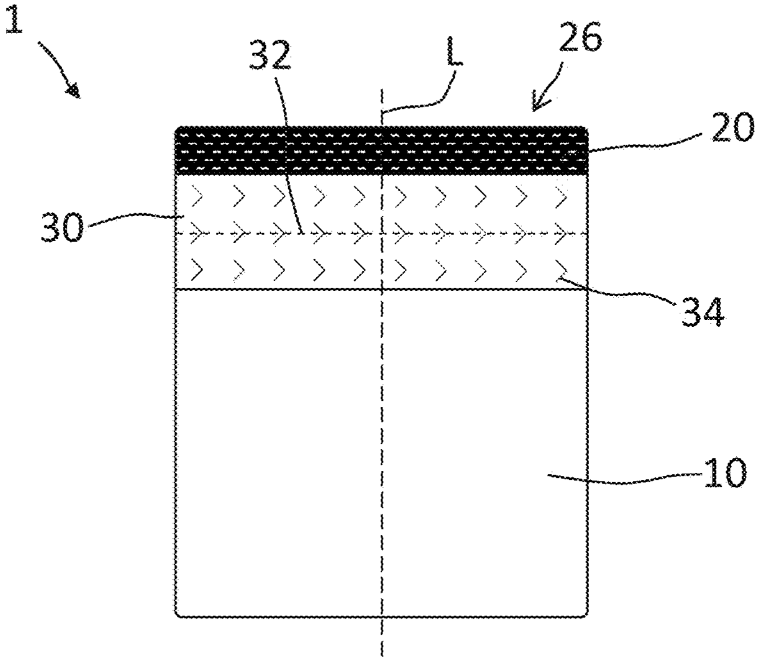
FIGS. 3A-3B show a further embodiment of a security label for a multi-part container.
Figure 3B:
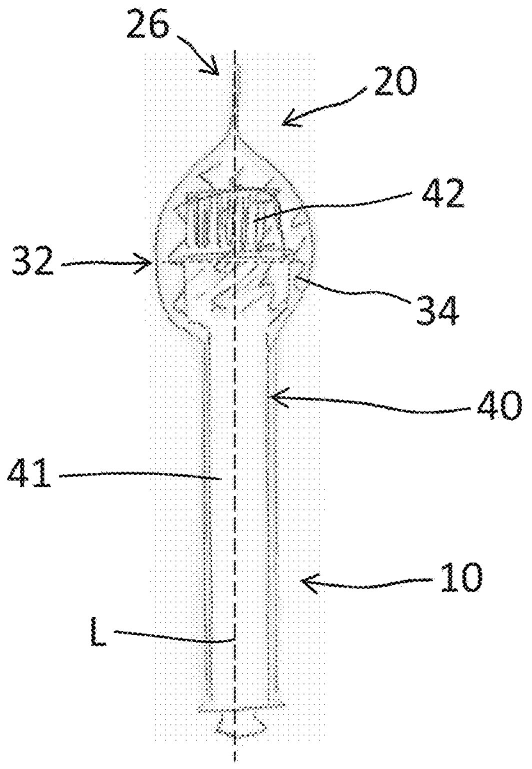

FIGS. 3A and 3B illustrate another embodiment of the security label 1 which, compared to the previously described embodiments, has a widened area 30 which has a plurality of introduced openings in the form of v-shaped punchings 34. In this way, a certain stretchability of the security label 1 is provided in the area 30, which can have a beneficial effect on adapting to different geometries of the syringe body 41 to the syringe cap 42. The punchings 34 thus realize a thickness compensation element and enable a simple and cost-effective variant of adapting the security label 1 to different radius ratios, if, for example, as shown in FIG. 3B, the tip cap 42 is larger in diameter than the syringe body 41. The syringe 40 is usually rotationally symmetrical or cylindrical in shape.

Figure 4A:
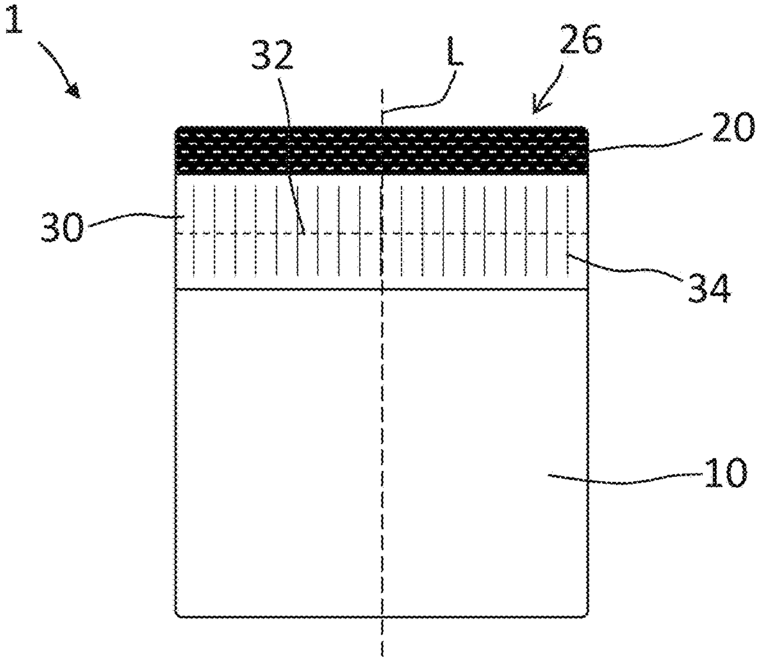
FIGS. 4A-4B show a further embodiment of a security label for a multi-part container.
Figure 4B:
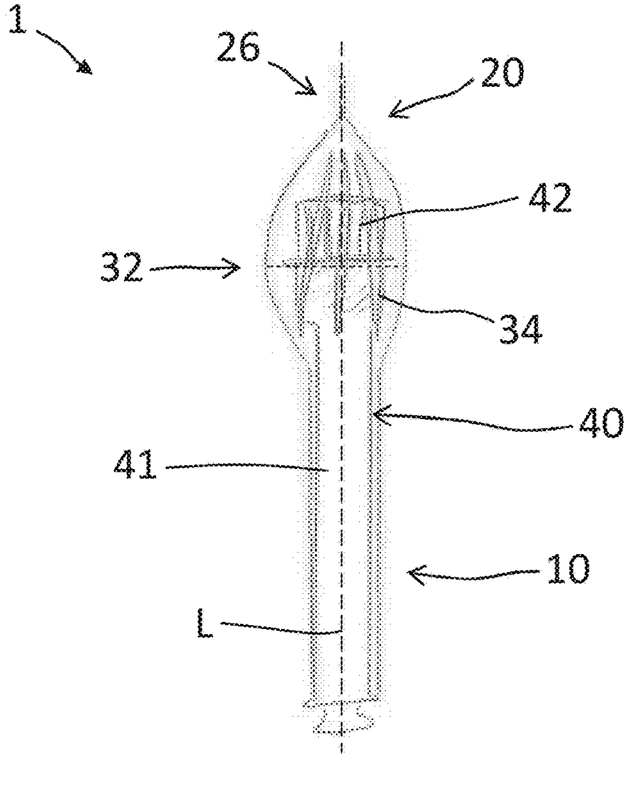

FIGS. 4A and 4B illustrate a further embodiment of the security label 1 which, in comparison with the embodiment according to FIGS. 3A and 3B, has a plurality of introduced openings in the form of linear incisions or punchings 34 which, like gills, provide a certain flexibility of the security label 1 in the area of the syringe cap 42. The embodiments of the security label 1 shown in FIGS. 3A-3B and 4A-4B are particularly suitable for syringes 40, which comprise the syringe cap 42 designed to be larger than the syringe body 41 with respect to a diameter. The security label 1 then realizes a kind of half-open closure around the syringe cap 42, which provides reliable and safe tamper protection and also radial adaptability.

The embodiments of the security label 1 shown in FIGS. 3A-3B and 4A-4B are particularly suitable for syringes 40 whose syringe cap 42 is configured to be larger in diameter than the syringe body 41.

Figure 5A:
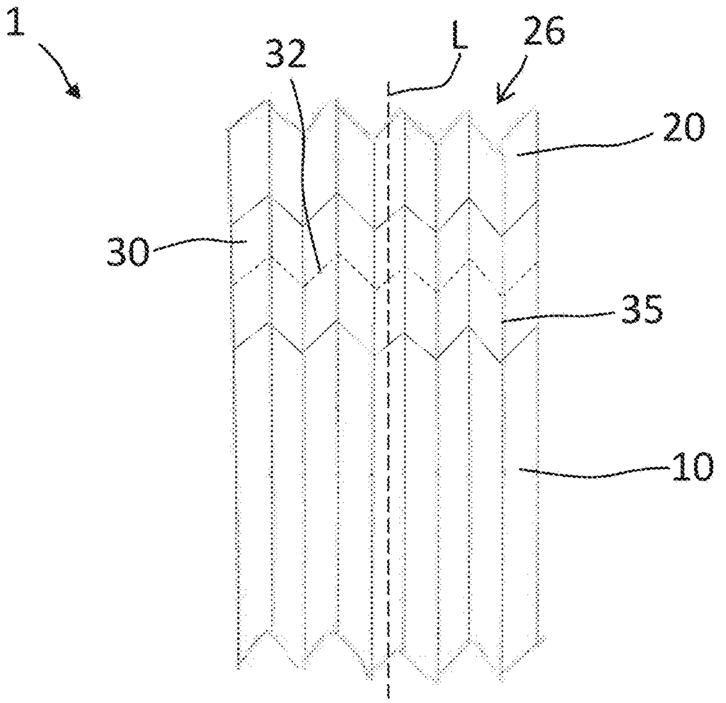
FIGS. 5A-5B show a further embodiment of a security label for a multi-part container.
Figure 5B:
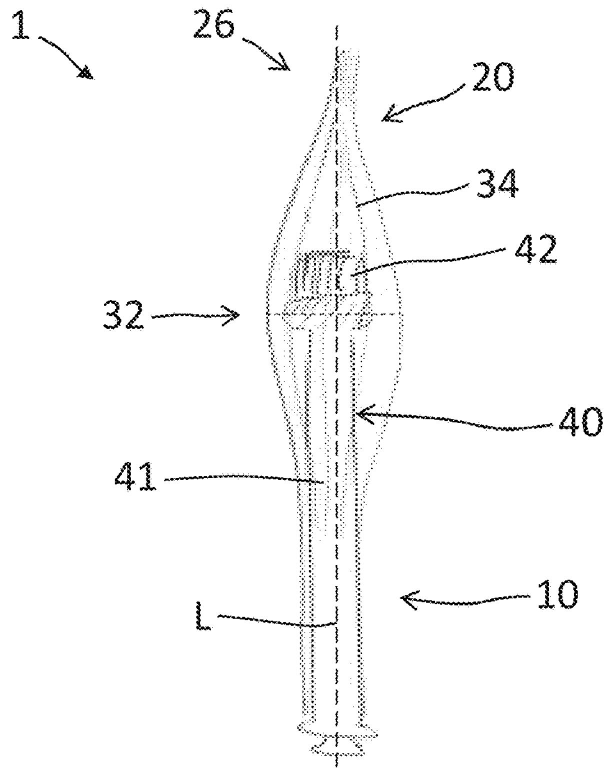

FIGS. 5A and 5B show a further embodiment of the security label 1 with a further possibility to provide a certain stretchability or flexibility with respect to syringes 40 of different sizes or widths. The security label 1 presents a fan structure with a plurality of fold lines 35, which allows the security label 1 to be unfolded where a correspondingly larger circumference is provided due to larger radius ratios.

The fold lines 35 according to FIGS. 5A and 5B, as well as the linear punchings 34 according to FIGS. 4A and 4B, can also be formed obliquely and are not necessarily to be formed parallel to outer edges of the security label 1.

Figure 6:
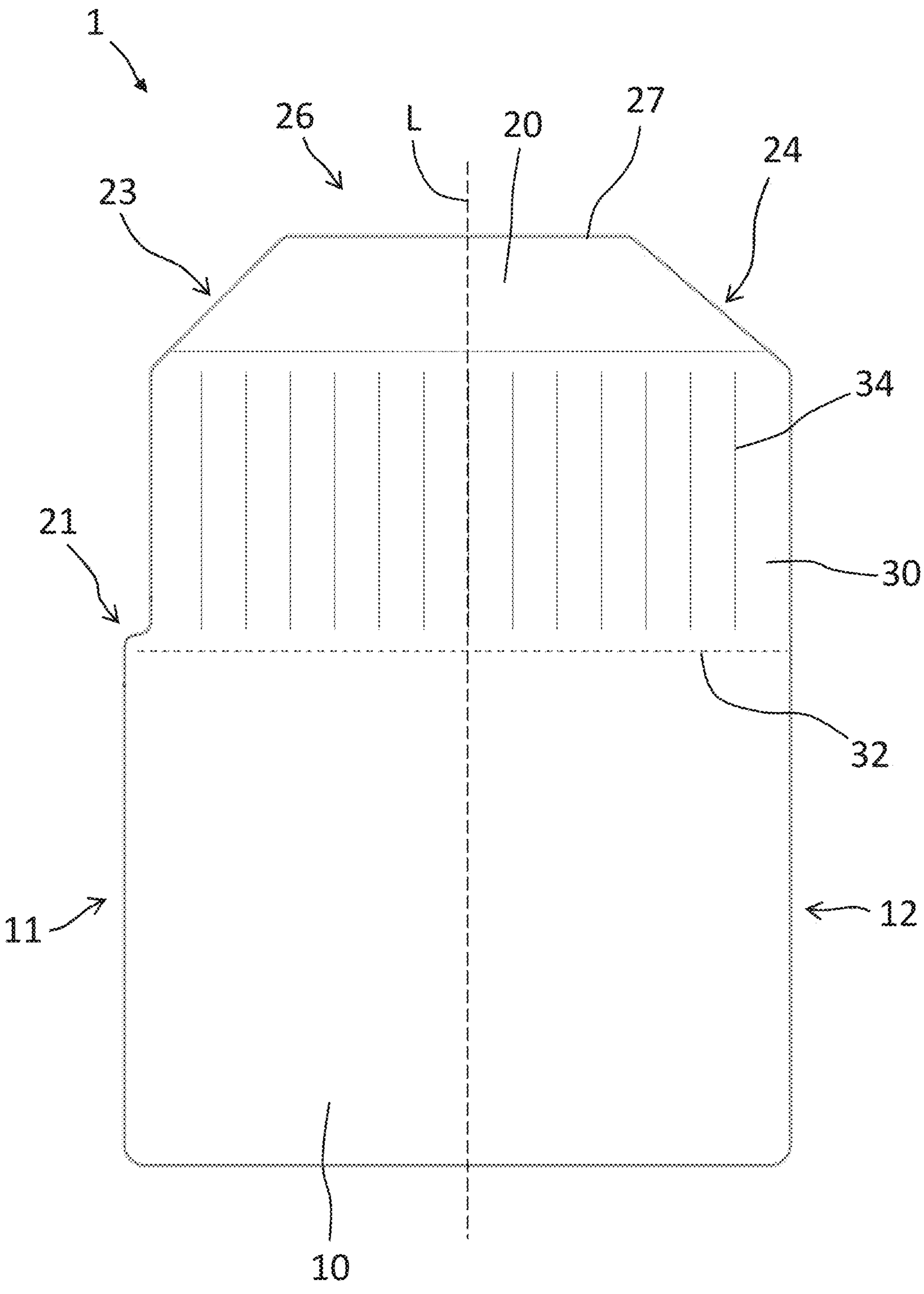
FIG. 6 shows a further embodiment of a security label for a multi-part container.

FIG. 6 shows a further embodiment of the security label 1, which has an edge offset 21 along a leading edge 11 in the transition of the first label section 10 to the second label section 20 to contribute to a beneficial and secure adhesion of the security label 1 to the multi-part container or syringe 40. Furthermore, the second label section 20 has a tapered shape towards the upper end 26 with tapered edges 23, 24 along the leading edge 11 and a trailing edge 12. Such a configuration of the security label 1 enables particularly precise attachment to a syringe 40 having different radius geometries, and prevents corners of the second label section 20 from undesirably protruding after wrapping around the syringe cap 42. Moreover, in this embodiment example, the adhesive-free area 30 is completely arranged in the second label section 20 and has a plurality of incisions or punchings 34.

Figure 7:
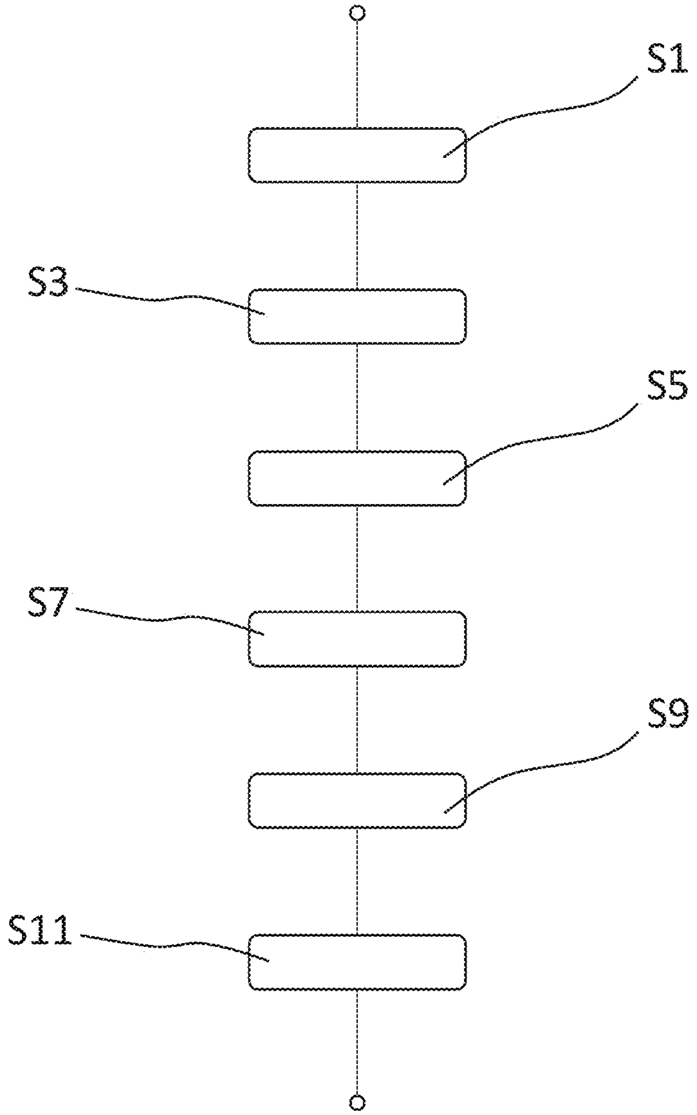
FIG. 7 shows a flow chart for a method of applying a security label for a multi-part container.

FIG. 7 shows an embodiment of a flowchart for applying the security label 1 to the multi-part container. For example, in an application process to a syringe 40 having a smaller diameter at the syringe cap 42 than at the syringe body 41, the following steps are performed:

In a step S1, the syringe 40 and the security label 1 are provided with the two label sections 10 and 20 made from one material web and a perforation 32 disposed therebetween.

In a further step S3, for example, a rotatably mounted sleeve is provided and pushed over a cap region of the syringe 40 to form a cylindrical overall body of approximately constant diameter, which can be labeled in a simple manner. Contact with the cap portion of the syringe 40 can be prevented in this manner.

In a further step S5, the security label 1 is attached to the syringe body 41 with its adhesive bottom side in the first label section 10.

In a further step S7, the second label section 20 is attached to the syringe cap 42 by wrapping the syringe cap 42 with the second label section 20 having an adhesive neutralized underside. The second label section 20 now surrounds the syringe cap 42 and is adhered to itself in an overlap region as an overlap wrap-around label.

Steps S5 and S7 can be carried out one after the other, as described above, or alternatively simultaneously.

In a further step S9, the inserted auxiliary in the form of the sleeve can now simply be pulled out of the enclosure of the applied security label 1 again.

In a further step S11, the free end 26 of the second label section 20 is closed in on itself along the edge line 27 so that the upper end 26 of the second label section 20 is sealed above the syringe cap 42. The label sleeve formed by means of enveloping the second label section 20 can be securely closed and reliably sealed by means of bonding and/or welding.

According to the described method, an application of the security label 1 to the syringe 40 can be made beyond the syringe cap 42 without touching the needle area.

Figure 8A:
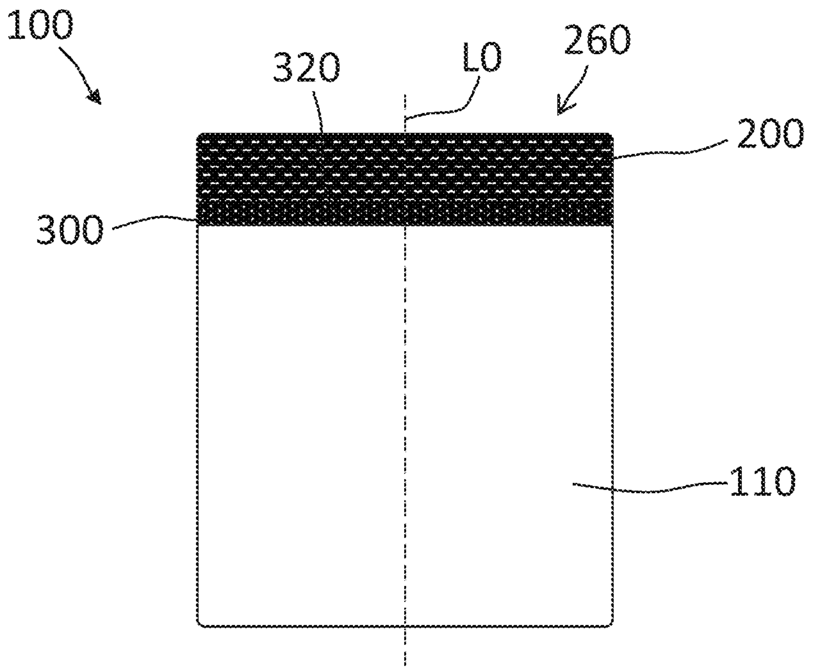
FIGS. 8A-8B show a further embodiment of a security label for a multi-part container.
Figure 8B:
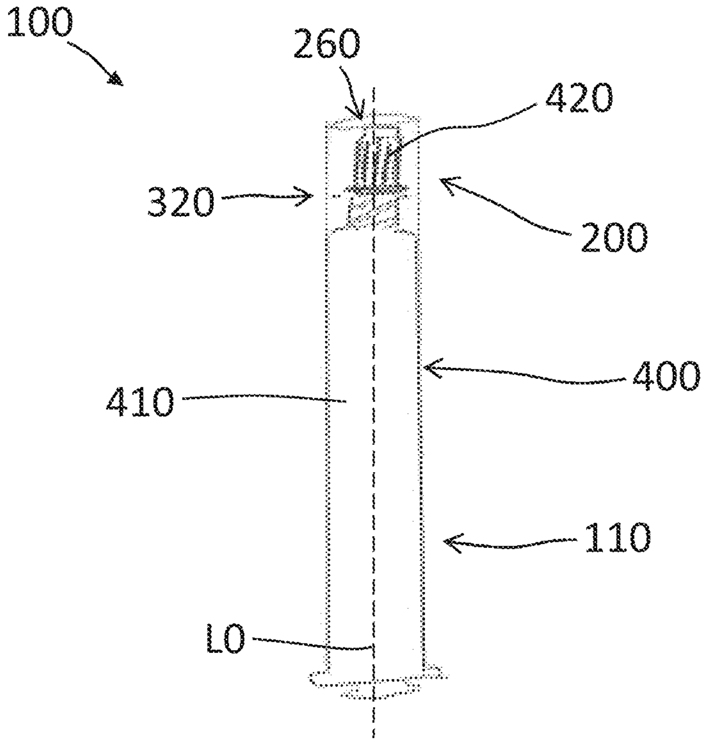

FIGS. 8A and 8B illustrate in schematic views a security label 100 for a multi-part container 400, which may be, for example, a syringe or an injection vial. The security label 100 has a first label section 110 configured to be attached to a first part 410 of the container 400, and a second label section 200 configured to encircle a second part 420 of the container 400 with respect to a state of the security label 100 applied to the container 400, so that the security label 100 forms a label sleeve along an edge line at a free end 260 of the second label section 200 facing away from the first label section 100, the label sleeve being closed in itself but open upwardly with respect to a longitudinal axis L0 of the security label 100.

The two label sections 110 and 200 thereby form a respective mutually adjacent part of a common material web. The security label 100 further comprises a perforation 320 as a severing element, which is arranged between the first and the second label sections 110, 200 with respect to the longitudinal axis L0 of the security label 100, so that when the container 400 applied with the security label 100 is opened, the security label 100 can be severed in a predetermined manner by means of the perforation 320 and the second label section 200 can be removed together with the second part 420 of the container 400 from the first label section 110 and the first part 410 of the container 400.

According to a preferred embodiment of the security label 100, the perforation 320. Alternatively or additionally, the severing element may also comprise a tear strip to enable controlled separation of the second label section 200 from the first label section 110. The perforation 320 may have a special geometry and is not necessarily arranged parallel to an outer edge of the security label 100.

According to another preferred embodiment of the security label 100, as shown in FIG. 1A, the security label 100 has an adhesive-free area 300 in the region of the perforation 320. In this way, easy severing of the security label 100 and removal of the second label section 200 from the first label section 110 can be made possible. A force required to separate the two label sections 110, 200 is thus reduced compared to a fully adhesive security label 100 and an opening dynamic of the container 400 applied with the security label 100 is improved.

In addition, the security label 100 may also be fully covered with an adhesive layer on an underside to allow for easy adhesive attachment of the security label 100 to an outer wall of the container 400. Alternatively, the security label 100 has an adhesive layer on the underside of the first label section 110 and spaced therefrom on an underside at the upper end 260 of the second label section 200. Basically, the perforation 320 forms a type of boundary on a respective side of the two label sections 110, 200. The adhesive-free region 300 may extend toward the first and/or second label sections 110, 200.

Terms such as "top", "bottom", "above" and "below" refer to illustrated FIGS. 8A and 8B and an operational arrangement or use of the security label 100 and the container 400, wherein the top, second label section 200 is associated with the top, second part 420 of the container 400 which is removed to open the container 400.

In the fully applied state, the security label 100 simultaneously forms a body label and a seal label which reliably and securely encloses the openable second part 420 of the container 400. In this way, a particularly effective tamper protection for the container 400 can be realized and, in addition, a protective function for an ingredient against the effects of radiation, moisture and other influences can be provided. The security label 100 can also be designed with multiple layers for the protective purpose, among other things.

The perforation 320 is preferably formed in an area of the security label 100 which, with respect to an applied state on the container 400, corresponds to the area between the second part 420 and the first part 410. A geometry of the security label 100, in particular a width and length of the respective label sections 110, 200 is preferably formed to match the geometry of the container 400 so that the security label 100 realizes, for example, an all-around or an overlap wrap-around label.

In particular, the security label 100 may have a predetermined printing layer to reduce or close a gap between the second part 420 of the container 400 and the wrapped second label section 200 such that manual access to the openable second part 420 of the container is not possible or hardly possible without damaging the security label 100. Such a printed layer is therefore preferably applied to an underside of the second label section 200 in an area which, in a state applied to the container 400, faces the second part 420 and fills the gap between the security label 100 and the container 400.

In addition, such a printed layer enables a function as a thickness compensation element and enables a potential compensation of different radii of the first and second part 410, 420 of the container 400. Such a relatively thick printed layer can be applied, for example, by means of a matrix technique in a screen printing process.

The security label 100 combines the functions of a body label with those of a seal label in the form of one common label. Access to the container closure or to the openable, second part 420 of the container 400 is not possible or only possible with difficulty without damage to the security label 100.

Application of the security label 100 can be carried out analogously to the previously described application process according to the flowchart shown in FIG. 7, omitting a sealing step analogous to step S11.

Although only a few embodiments of the present invention have been shown and described, it is to be understood that many changes and modifications may be made thereunto without departing from the spirit and scope of the invention.

REFERENCE SIGNS

1, 100 Security label
10, 110 first label section
11 leading edge of the security label
12 following edge of the security label
20, 200 second label section
21 edge offset
23 tapered edge of the second label section
24 tapered edge of the second label section
26, 260 upper end of second label section
27 upper edge line of the second label section
30, 300 adhesive-free area
32, 320 perforation
34 punching
35 folding line
40, 400 container/syringe
41, 410 first part of the container/syringe body
42, 420 second part of the container/syringe cap
L, L0 longitudinal axis
S(i) steps of a method for producing the security label

What is claimed is:

1. A system, comprising:

a container divisible into a plurality of parts, comprising a container body for receiving an ingredient and a removable container closure, and a security label, comprising a first label section and a second label section which each form a respective part of a common material web, and a severing element which is arranged between the first and second label section along a longitudinal axis of the security label, wherein the security label does not comprise shrink film material, wherein the security label is applied to the container such that the first label section is attached to the container body and the second label section surrounds the container closure, the second label section being formed such that the security label is closed along an edge line above the removable container closure by welding such that the second label section encloses the removable container closure, so that when the container applied with the security label is opened, the security label is predeterminedly severable by the severing element and the second label section is removable together with the removable container closure from the first label section and the container body, and wherein the end of the second label section is sealed to itself by welding along the edge line.

2. The system according to claim 1, wherein the security label comprises an adhesive layer disposed on an underside of the first label section, such that the security label is attached on the container body by adhesion.

3. The system according to claim 1, wherein the security label has an adhesive-free surface in the region of the severing element.

4. The system according to claim 1, wherein the severing element is formed in a transition between the container body and the removable container closure.

5. The system according to claim 1, wherein the severing element comprises a perforation and/or a tear strip.

6. The system according to claim 1, wherein the second label section comprises at least one of a punching, a fold line and a print layer.

7. The system according to claim 1, wherein the security label comprises an indicator layer disposed in the region of the severing element on the first and/or second label section, configured to indicate removal of the second label section from the first label section.

8. The system according to claim 1, wherein the closed edge line is formed straight or rounded.

* * * * *